United States Patent [19]

Combs

[11] Patent Number: 4,844,423
[45] Date of Patent: Jul. 4, 1989

[54] POP-UP STOCK GUARD

[76] Inventor: Linsey L. Combs, Rte. 4, Box 185, Holdenville, Okla. 74848

[21] Appl. No.: 261,692

[22] Filed: Oct. 24, 1988

[51] Int. Cl.$^4$ ............................................. A01K 3/00
[52] U.S. Cl. ......................................... 256/17; 256/14
[58] Field of Search ....................... 256/14, 15, 16, 17, 256/18

[56] References Cited

U.S. PATENT DOCUMENTS

| 2,744,728 | 5/1956 | Melchert et al. | 256/14 |
| 2,846,194 | 8/1958 | Wells | 256/14 |

FOREIGN PATENT DOCUMENTS 960157  6/1964  United Kingdom ................. 256/17

Primary Examiner—Andrew V. Kundrat
Attorney, Agent, or Firm—Richard Bojanowski

[57] ABSTRACT

A Portable Cattle Guard is provided which includes an assembled rectangularly shaped base member. Contained within the confines of the base member are a pair of inclined spring biased cattle ramps moveably connected along their longitudinal axis to provide a slight apex when in the relaxed state. The base member includes a pair of hollow vertical posts having inwardly facing guide slots cut therein. Each hollow post contains a coiled spring fixed at its upper end to the upper section of the post. The other end of the spring is connected to an end section of a leading bar of one of the ramps which is sufficiently extended to enter each of the guide slots. When a vehicle is driven on the spring-biased ramp, the ramp is flattened so that it is substantially parallel with the ground surface. When the vehicle passes over the ramp, the extended spring returns the ramp to its normal relaxed apex forming position.

7 Claims, 2 Drawing Sheets

POP-UP STOCK GUARD

BACKGROUND OF THE INVENTION

Cattle are normally enclosed within the confines of a fixed fence line area. In most cases, there are several openings along the fence line to permit vehicles and farm equipment to pass into the enclosed area. When gates are used to close the openings, it is necessary for the driver of a vehicle to egress and open or close the gate upon entering or leaving the confined area. In order to avoid the above, cattle guards are provided in between openings in a fence line which facilitates movement therethrough.

Cattle and other farm animals are reluctant to pass over parallel spaced apart bars forming a cattle guard as they are normally placed over a ditch and create an unstable ground area. However, if the cattle guards are substantially flush with the ground surface, cattle will, after a period of time, eventually cross over the cattle guards. Therefore, most cattle guards are placed over ground areas that are sunken or where a trench has been cut. This type of arrangement necessitates that the cattle guards be constructed from thick gauge steel capable of supporting vehicles passing thereover.

Accordingly, a need exists for a type of cattle guard which is capable of providing a space between the ground surface while at the same time being constructed of a material which is light weight and can be easily assembled and placed between fence openings.

In addition, the location of the fence openings may be changed from time to time requiring additional cattle guards to be purchased. This entails a substantial expense to a farmer or rancher as the existing cattle guards cannot be readily relocated and are not considered portable. It is therefore highly advantageous to have cattle guards that are light weight, inexpensive and portable.

Cattle guards have been in use for over a hundred years, along fence openings, across roads and to inhibit cattle from crossing onto railroad tracks. Examples of various types of cattle guards including their general structural and operational features can be found in U.S. Pat. Nos. 117,600, 1,529,460, 1,620,348, 322,399 and 4,609,184.

BRIEF DESCRIPTION OF THE INVENTION

The portable cattle guard of the instant invention incorporates a rectangularly shaped base member comprising two side members and the two end members secured by conventional securing means, such as bolts, screws and preferably by pins.

Each of the side members of the rectangular base member has a vertically mounted hollow tubular post member centrally fixed thereto. Each of the tubular posts have a guide slot cut in opposed relation to each other. Within the tubular member is a coiled spring having its upper end fixed to the upper section of the hollow tubular post member. The bottom portion of the spring is looped around the leading bar of a first ramp which extends into the vertical guide slot. Moveably connected to the leading bar of the first ramp is a second ramp causing the ramps to be inclined with respect to each other. The first ramp consists of a plurality of longitudinally spaced apart bars fixed at their ends to a pair of parallel end bars. It is essential that the lead bar of the first ramp be longer than the other bars comprising the ramp. It must be of such length that it extends into the guide slot of the tubular post and be attachable to the lower end of the spring. The cattle guard ramps are positioned within the confines of the rectangular base member so that it forms an apex along the plane of its moveable juncture.

As a vehicle moves on the ramp, the ramp is flattened to rest upon the surface of the ground. When the vehicle passes over the ramps, the ramps are automatically raised at its point of connection to reform the apex shape that it originally had.

The main object of this invention is to provide a cattle guard that is portable and can be readily moved and reassembled at any desired fence line opening.

Another object of this invention is to provide a cattle guard which appears to approaching animals to be suspended over an open area and thereby create the illusion that there is nothing below the parallel spaced bars or rods creating the cattle guard.

Another important object of this invention is to provide a structure which will permit vehicles to pass thereover without damaging the cattle guard system.

Still another object of this invention is to provide a cattle guard which does not require a trench or ditch to be dug at the fence line prior to installation of the cattle guard.

Another very important object of this invention is to provide a portable cattle guard which can be constructed from inexpensive, light-weight materials and thereby substantially reduce the costs and number of cattle guards that might be required.

A final object of this invention is to provide a cattle guard which can be used over a flat ground area.

These, along with other objects and advantages of this invention will become more readily apparent when construing the specification and drawings accompanying the specification wherein like numerals refer to like parts throughout.

DETAILED DESCRIPTION OF THE INVENTION

Referring now more specifically to the drawings, the numeral 10 designates generally the portable cattle guard of this invention. The cattle guard comprises generally a rectangular shaped base or support number 12. A first and second inclined cattle guard ramp 14 and 16 moveably connected to each other are positioned within the confines of the base member.

Figure 1:
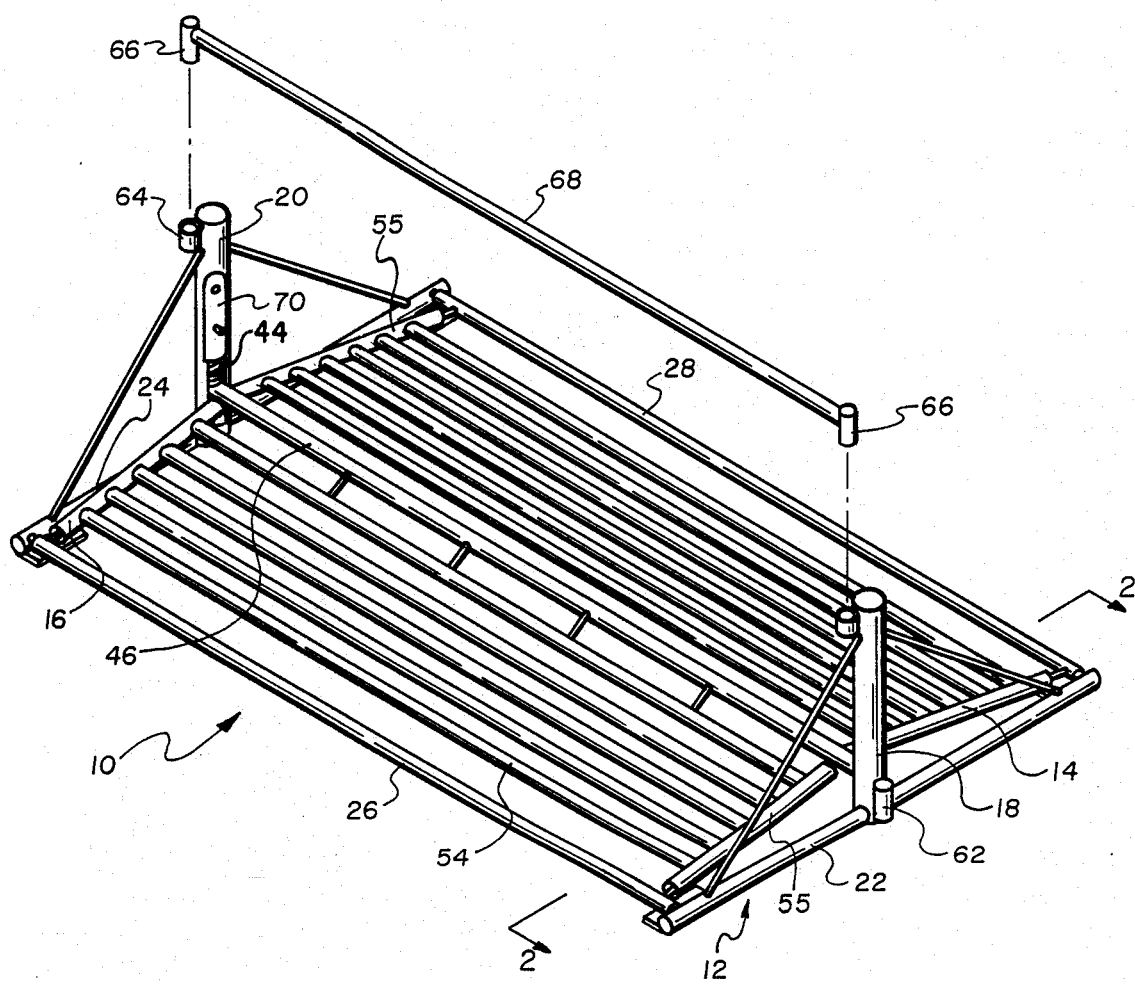
FIG. 1 is a perspective view of a cattle guard according to the invention shown fully assembled and in its operating position.
Figure 2:
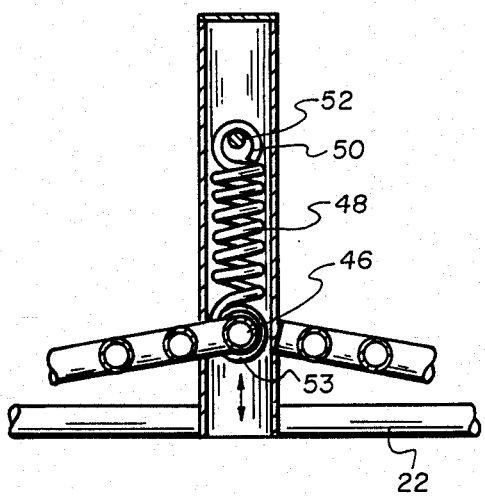
FIG. 2 is a fragmentary cross-sectional view taken along line 2—2 of FIG. 1.
Figure 3:
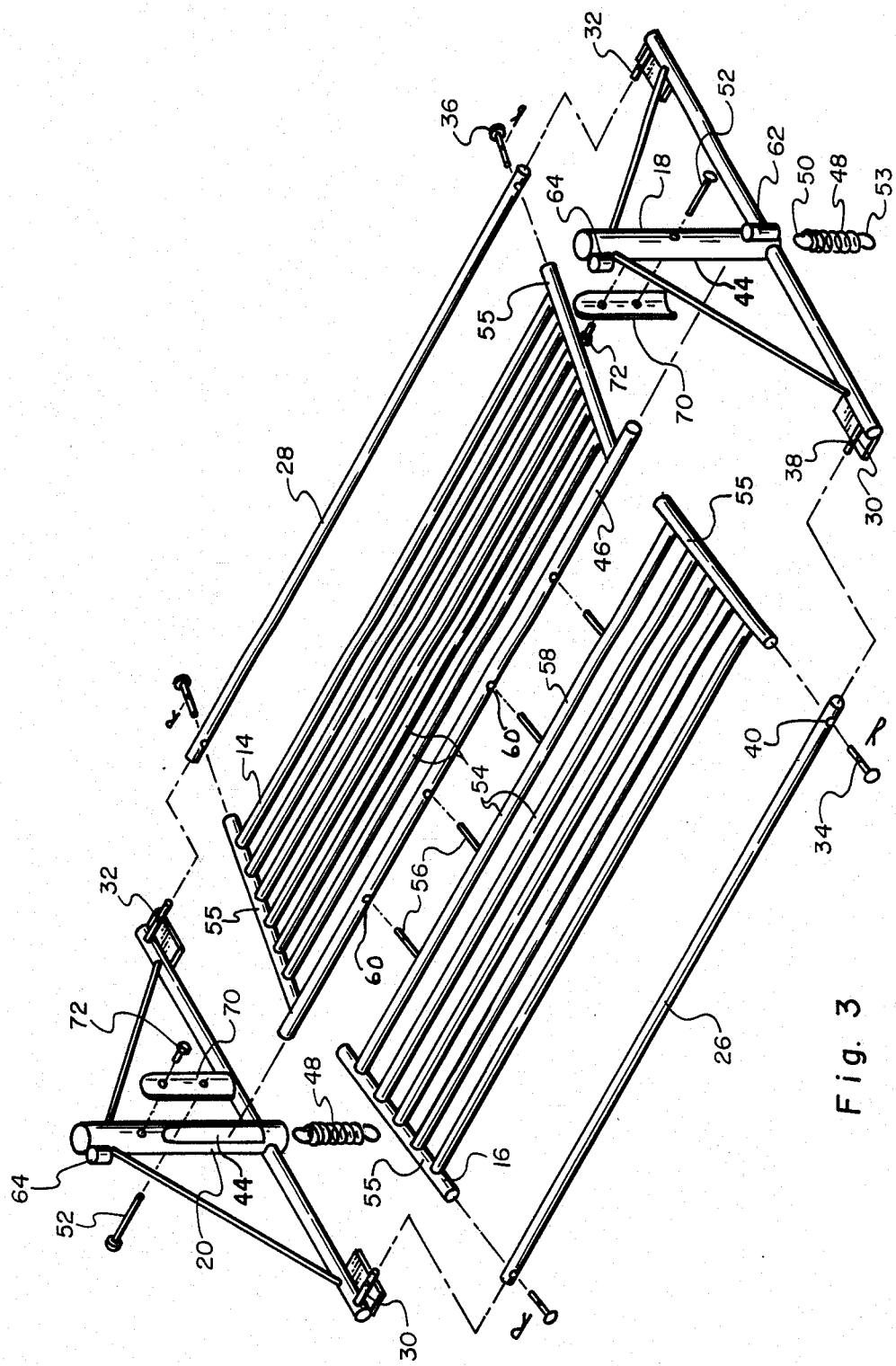
FIG. 3 is an exploded view of the elements comprising the assembled cattle guard of FIG. 1.

The base member, 12 includes a pair of side bars 22 and 24 which are normally constructed from steel tubes or rods joined to a pair of tubular end members 26 and 28 respectively. Each of the side bars have metal pegs or dowels 30 and 32 welded to its end sections so that they can be inserted into the open ends of the tubular end members 26 and 28. The end and side members are secured to each other by any conventional means such as by pins 34 and 36 which pass through aligned openings 38 and 40 drilled in the dowels 30 and 32 and end members 26 and 28. Cotter pins 42 may be used to hold the pins in position. Attached centrally to each of the side bars of the rectangular base member are two hollow tubular post members 18 and 20. Each of the hollow tubular post members contain an opposing guide slot 44 cut into a portion of the post members 18 and 20. The guide slots provide for vertical movement or up and down movement of the extended leading bar 46 of the first ramp 14. Contained within the hollow tubular post member is a coiled spring 48 with its upper end 50 looped so that it can be held to the upper end of the tubular post member by means of a pin or bolt 52 passing transversely therethrough. The other end 51 of spring 48 has a loop 53 into which the end of the leading bar 46 of the first ramp can be inserted and secured thereto. The hollow tubular post member on the other side of the cattle guard is identical to the one just described. All elements have been duplicated and have been identified by the same numerals previously used. Both contain a coiled spring in which the bottom portion of the spring is hooked to one end of the leading bar 46 extending into the guide slots cut into the vertical posts. The size and tension of the springs are such that the leading bar can be maintained in a raised position above the ground surface. When the first and second ramps are moveably connected, two inclined ramps are formed forming an apex along the plane of joinder. The springs possess sufficient tension so that when a vehicle enters upon the inclined ramps, they are flattened to come in contact with the ground surface. When the vehicle passes over the cattle guard, the ramps will rise to their original apex-forming inclined position. The cattle guard ramps are preferably constructed from tubular steel or iron intermittently positioned such that a space of about three to four inches is provided in between each of the equidistant, parallel spaced longitudinal bars identified by the number 54. The longitudinal bars are welded to a pair of lateral or side bars 55 to form a ramp. Each ramp will contain approximately five to eight bars each. The ramps 14 and 16 are joined to each other by a type of moveable means. As shown in FIG. 3, the moveable means is achieved by the use of rods 56 welded to bar 58 of the second ram.. Rods 56 enter into openings 60 bored into the leading bar 46 of the first ramp 14. The rods are of such length and the holes are of such diameter that they are retained in the opening during movement of the ramps. In addition to what has already been described, the hollow tubular post members have sleeves 62 welded thereto at or near their bottoms for receiving a stake (not shown) which is introduced into the ground for securing the cattle guard in a fixed and stationary position. In addition, a second cup or sleeve 64 is positioned on one of the sides of the hollow tubular post for receiving a vertical rod 66 welded to the ends of optional barrier bar 68.

A cover plate 70 is provided to partially cover the guide slot 44. The cover plate is fastened to the vertical posts 18 and 20 by a threaded bolt or screw 72. Removal of the plate provides for easy access to the spring if it has to be repaired or replaced over time.

To ensure free up and down movement of the hinged cattle guard ramps, the area of the ramps when moveably joined, and in a flattened out position will be slightly less than the area of the rectangular shaped based member. This is necessary in order to ensure that the ramp when depressed by a vehicle passing thereover will not impinge upon the end members 26 and 28 when the ramp is in the flattened horizontal position.

In operation and use, the portable cattle guard, heretofore described, consists of six major pieces which may be readily assembled at a fence opening. This is achieved by connecting the two side bars 22 and 24 with the two end members 26 and 28 by pins 34 and 36. This forms base member 12. The first and second cattle guard ramps may then be moveably joined within the confines of the base member by inserting rods 56 into openings 60. The ends of the leading bar 46 are then inserted through each of the loops 53 of springs 48 located within the vertical posts 18 and 20. The ramps are now in a raised position to form an apex and are ready for use.

In summary therefore, the devise of this invention includes a pair of cattle guard ramps which are confined within a rectangular base member. A vertical post member is centrally attached to the base member. Each of the post members has a biasing means, such as a coiled spring, operatively housed within the post members. One of the cattle guard ramps has its end section engaged within the biasing means so that it is raised above ground level. The other cattle guard ramp is moveably connected to the raised end of the first cattle guard ramp so that an apex is formed along the plane of connection. The two ramps and the ground surface form a triangle wherein the angle at the apex is obtuse.

When a vehicle comes into contact with either ramp, both ramps are flattened parallel with the ground surface. When the vehicle passes over the ramp, it returns to its normal or raised position by means of the coiled spring and thereby reforming the apex.

The foregoing is considered as illustrative only since numerous modifications and changes will readily occur to those skilled in the art. There is no intent to limit the invention to the exact construction, operation or materials shown and described. As a result, all suitable modifications and equivalents which could be used would fall within the scope of this invention.

I claim:

1. A portable cattle guard comprising two side members interconnected to provide a substantially rectangular base member, a hollow tubular post member centrally and vertically fixed to each side member, said tubular post member having a vertical guide slot cut therein, a first ramp and a second ramp positioned within the confines of said rectangular base member, a means for moveably joining said first ramp with said second ramp, a biasing means having a top and bottom end section housed within each of said tubular post members wherein each top section of said biasing means is fixed near the upper section of said post member and each bottom section of said biasing means is adapted to engage one of the ends of said first ramp.

2. The portable cattle guard of claim 1 wherein said biasing means is a coiled spring.

3. The portable cattle guard of claim 2 wherein each of said hollow tubular post members includes a sleeve adapted to receive a means for fixing said rectangular base member to a surface.

4. The portable cattle guard of claim 1 wherein said first ramp includes a plurality of longitudinally spaced apart bars fixed perpendicularly to a pair of side bars, said first ramp having a lead bar which extends beyond said side bars and into said vertical guide slots for engaging said biasing means.

5. The portable cattle guard of claim 4 wherein said second ramp includes a plurality of longitudinally spaced apart bars perpendicularly fixed to a pair of side bars.

6. The portable cattle guard of claim 5 wherein each of said hollow tubular post members include a means for receiving a removable cross bar.

7. A portable device comprising a pair of cattle guard ramps confined within a rectangular base member, a vertical post member fixed to said rectangular base member, a biasing means operatively housed within said vertical post member, a means for connecting one of said cattle guard ramps with said biasing means and means for moveably connecting said other cattle guard ramp with said ramp connected to said biasing means so that an apex can be formed along the plane connecting both cattle guard ramps when a minimal force is exerted on said biasing means.

* * * * *